March 3, 1953 W. S. SCHAEFER 2,630,514
SEAM WELDING PROCEDURE
Filed June 14, 1950 2 SHEETS—SHEET 1
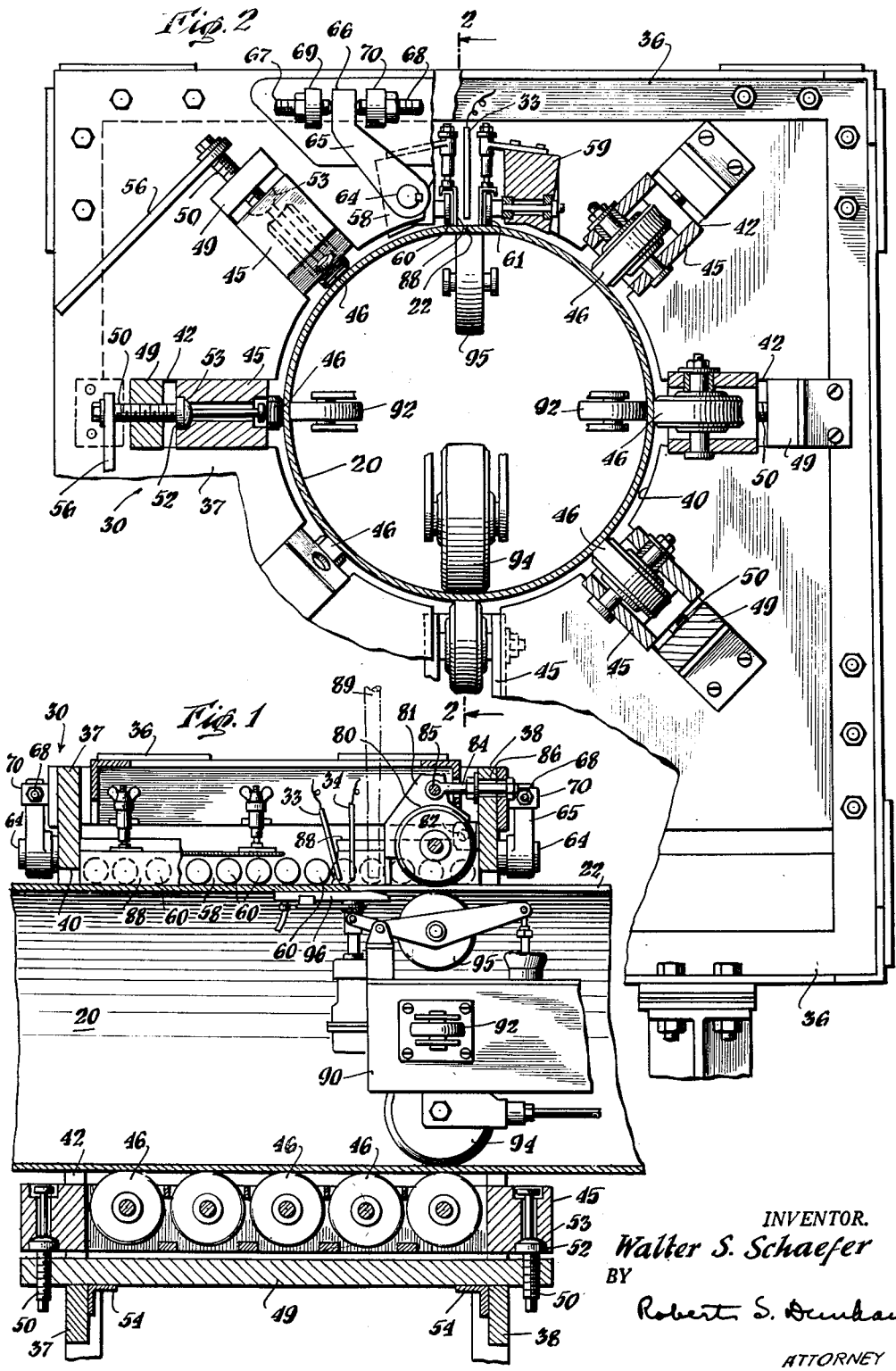
INVENTOR.
Walter S. Schaefer
BY
Robert S. Dunham
ATTORNEY

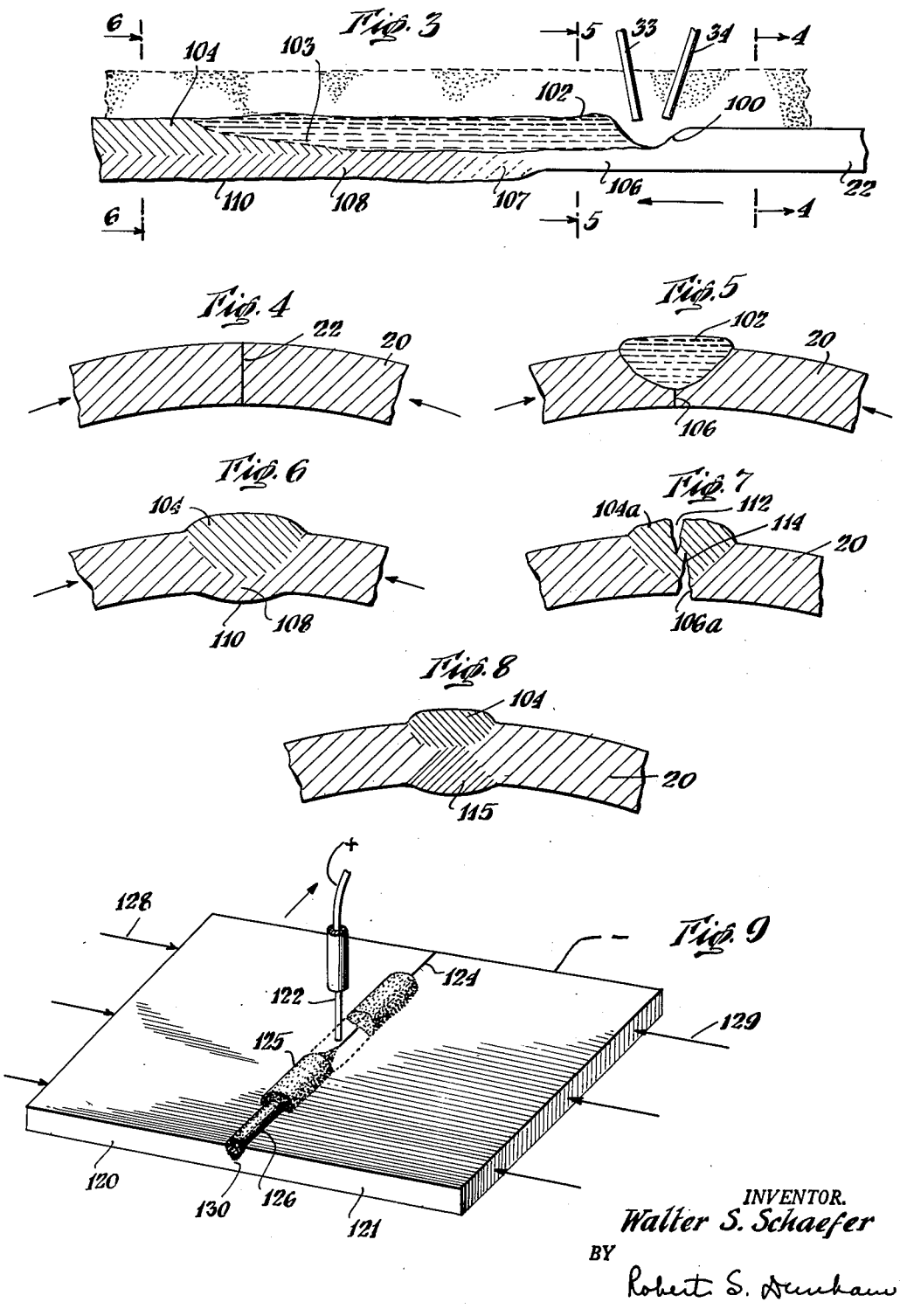

UNITED STATES PATENT OFFICE 2,630,514

SEAM WELDING PROCEDURE

Walter S. Schaefer, East Gadsden, Ala., assignor to Republic Steel Corporation, Cleveland, Ohio, a corporation of New Jersey Application June 14, 1950, Serial No. 168,038

10 Claims. (Cl. 219—10)

This invention relates to the welding of joints between abutting metal surfaces, and more particularly to procedure wherein a fusion, e. g. arc welding operation is performed along the joint, primary objects of the invention being to provide a more effective or complete joining of the metal portions in an essentially single operation, and to permit a more rapid and yet more reliable welding process.

In a specific and particularly important respect the invention relates to the manufacture of pipe, especially large diameter pipe of steel or the like, wherein a seam is to be welded along a longitudinal cleft in a tubular pipe blank. For example, in an effective procedure for making pipe up to diameters of 24 to 30 inches or more (and useful for pipe of a wide range of smaller diameters, down to 6 inches or thereabout), large steel plates or sheets, called skelp, are first rolled to the desired tubular shape with the longitudinal edges of the sheet meeting to form a cleft along one side of the resulting pipe blank. The blanks may then be successively passed in an axial direction past a welding station, to weld the seam along the cleft of each blank; particularly satisfactory apparatus and procedure for automatically advancing the pipe blanks and arc welding the seam are described and claimed in the copending patent application of Frederic M. Darner and Walter J. Caine, Serial No. 99,101, filed June 14, 1949. Usually two successive arc welding operations are performed along the cleft, e. g. first on the outside of the pipe (as by the apparatus just mentioned) and then, separately, along the inside, it being preferred that neither weld penetrate all the way through the skelp or pipe wall, but that the second weld penetrate sufficiently into the first to insure a complete joint at the abutting edge surfaces of the skelp.

A further object of the invention is therefore to provide improved seam welding procedure for pipe manufacture and the like, whereby the likelihood of defects in the weld seam is greatly reduced and whereby greater assurance is had of the integrity and uniformity of the joint. A like object is to afford a greater speed of seam formation, i. e. operation at a faster rate of displacement between the welding instrumentalities and the work, yet without sacrifice of quality and with a desirable freedom of the welded seam from cracks, pin holes and other defects. A particular object of the invention is to afford seam welding procedure including provision for automatically and positively holding the abutting edges or other elements against mutual displacement while the molten metal of a fusion weld is solidifying or completing its solidification, such procedure thereby minimizing occurrence of defects caused by relative motion of the parts or elements, for example cracks, excessive penetration of molten metal, cavities or pin holes caused by trapped flux and the like.

A further object is to afford a simple and effective welding operation which results in a thoroughly welded or bonded joint between the entire edge surfaces at the cleft of a pipe blank, while preventing penetration of fluid, i. e. molten metal, more than part-way through the cleft, such complete weld of the seam being effected in a single operation, i. e. involving only a single pass of the work relative to the welding instrumentalities.

Other objects are to afford improved procedure and operations for seam welding, accomplishing one or more of the foregoing results, and applicable to a variety of seams or joints between abutting metal surfaces.

In the manufacture of pipe as explained above the operation of welding the seam along the outside of the pipe blank has involved the advance of the blank through a suitable chuck or the like, wherein roller means engaging the outer surface of the blank are designed to hold it while it passes the welding electrode or electrodes. In such procedure, as the speed of operation increases, e. g. at the greater speeds of travel of the pipe blank past the welding station, increasing trouble has been occasioned, apparently due to slight displacement or motion of the edges of the cleft during the welding operation, for example movement of one edge relative to the other while the puddle of weld metal is solidified. Cracks and cavities are more likely to be found in the completed weld bead. Furthermore, since the operation is preferably performed with a heavy layer of flux (supplied in granular form) over the cleft, it also appears that trapped quantities of molten flux tend to give rise to pin holes or other cavities within the body of metal intended to constitute the weld. Although the welding operation is controlled with the view of preventing penetration of the molten metal beyond a part of the depth of the cleft, e. g. not more than two-thirds or three-fourths of such thickness of the pipe wall, there is at least an occasional tendency for molten metal to travel through the lower, unwelded region of the cleft, often causing a further melting of the skelp in lateral directions in such region and providing a substantial flow-through of molten metal.

While such penetrated molten metal may be retained by the chill member which is pressed against the underside of the pipe blank at the cleft, the joint tends to be weak or imperfect at such localities and the metal reaching the other side of the cleft spreads out as a layer with little or no bond to the underface of the skelp. While some of these difficulties are corrected by the subsequent inside welding along the cleft, there is no elimination of cracks and cavities at localities to which the inside weld metal does not penetrate, and if there has been an unbonded overlap of weld metal on the inner face, at least a part of the inside weld bead may be similarly imperfectly bonded.

To the correction of these difficulties, especially in operating at higher speeds, and to the attainment of other ends such as stated above, it has now been found that greatly improved results are attained in the seam-welding operation by simultaneously forge-welding the portion of the cleft to which the fusion weld does not penetrate. More particularly, the improved process comprises subjecting the abutting edges or surfaces at the cleft to large pressure, forcing them together in such fashion that by the heat transmitted from the arc welding operation, the otherwise unmelted region of the cleft is effectively forged together. Thus a forge weld of the lower or remaining part of the abutting metal surfaces is produced, substantially at the same time as the fusion weld by electric arc operation, a further and specifically preferred feature of the invention being that the forge weld is essentially completed before the molten metal of the arc weld has fully solidified. Thus for example, as a pipe blank passes the welding station, producing a continuing cavity along the upper part of the cleft, such cavity being filled with fluid molten metal, the prompt completion of the forge weld between the lower, abutting portion of the cleft edges, serves to hold these edges positively and firmly against mutual displacement while the overlying puddle of metal is solidified. In consequence there is much less likelihood of cracks, cavities and other defects in any part of the joint, and particularly in the fusion-welded region.

It has further been found that in manufacturing pipe, the edgewise pressure at the cleft sufficient to effect the stated forge weld is readily achieved by exerting heavy compressive force in radial direction on the pipe blank as it traverses the welding chuck or like instrumentality. That is to say, by adjusting the rollers or other pipe engaging means of the chuck to engage the pipe blank with large force in a radial direction at a plurality of places around its periphery, the edges of the cleft are not only brought firmly together but are engaged with sufficient force to produce an integral bond, i. e. an actual forging or forge weld, of the unmelted regions of the cleft edges, at the high temperature produced by the arc welding operation. Since such temperature is rapidly reached and transmitted through the pipe wall at the region of the arc or arcs, this forge weld of the lower part of the cleft is achieved quite promptly, and indeed is understood to occur long before the puddle of weld metal resulting from the arc operation reaches the point of solidification. Since the cleft edges are preferably cleaned by mechanical, heat or other means prior to the welding operation, they are in perfectly suitable condition for the described forging as well as for the arc weld.

Furthermore, the melted flux of the fusion welding operation tends to seep through the cleft; indeed since the flux tends to melt and traverse the cleft at any given locality before the latter actually reaches the arc, it serves the purpose of dissolving and removing any iron or other oxides throughout the entire faces of the seam edges, the pressure exerted between the edges promoting this effect by squeezing the flux through and out of the cleft. As stated, it has been found that the resulting forge weld is a highly effective, strong bond of the metal elements, i. e. of the cleft faces throughout the locality below the embedded, so-called bead of molten metal resulting from the arc operation.

As also indicated, a prime function of the forge weld is to hold the cleft edges against any relative motion while the fused metal of the arc weld fully solidifies. In some types of fusion welding where the parts are clamped rigidly and continuous inspection of the cleft or seam line prior to welding is feasible, difficulties of the sort here discussed may not so frequently occur, but in the described pipe manufacture the difficulty of butting the cleft edges together, the arrangement of the welding chuck or fixture, the shape and nature of the large tubular pipe blank, and its continuous motion through the apparatus while the welding operations are performed, make it practically impossible to observe the cleft as it approaches the welding station, and make it extremely difficult to avoid some relative motion of the seam edges over the relatively considerable length of path which must be traversed while the puddle of metal produced by the arc is freezing.

Not only does the forge weld thus cooperate in preventing defects occasioned by mutual displacement of the cleft edges, but it is believed that the tremendous pressure employed in such weld, and likewise the condition of compression set up by the forging, may have a beneficial effect on the solidifying fused metal in the outer part of the cleft. The improved structure of the fused weld metal is believed to be attained in somewhat the same fashion as the recognized improvement of a pressure or centrifugal casting over a gravity casting. While the forging pressure may not be equivalent to pressure casting action when the outside weld metal is still molten, there is thought to be a highly beneficial effect during later stages of solidification, i. e. since the pressure between the cleft edges follows up the shrinkage of the molten metal through the mushy and soft phases of the latter. The pressure is normal to the plane of possible failure in the fusion weld, and is thus believed to have its greatest effect on such plane. In any event, and regardless of present understanding or theory, the complete, resulting seam structure represents an eminently sound joint and provides an effective and strong bond of the cleft edges at all localities, e. g. adjacent the inner as well as the outer face of the pipe.

A further advantage of the process is that it appears to reduce defects occasioned by trapped flux in the fusion weld metal. That is to say, where slight openings in the cleft below the arc puddle become filled with flux, such flux may work its way upward into the molten metal before or while the latter solidifies; as a result, pin holes or other cavities may be formed beneath the surface of the bead, constituting weakness or imperfection which cannot be detected by simple observation. Where the cleft edges are forced together and forge-welded in accordance with the present invention, it is impossible for flux to be caught between them and thus there is no possibility of flux re-entering the fusion weld region from below. At the same time, any flux which may have entered the upper or arc-produced cavity rises effectively out of the molten metal while it is still highly fluid.

While under certain conditions or for certain purposes it may remain desirable to provide a second, e. g. inside, weld along the cleft region by arc operation after the completion of the present procedure, such inside weld being effected in essentially the same manner as heretofore practiced, and while most of the advantages of the present invention (e. g. in affording greater speed of operation and in minimizing defects and imperfections of the seam) are nevertheless realized under such circumstances, a special feature of the invention is that it dispenses with the necessity for such an inside or second weld in many cases. Extensive tests has shown that the complete seam resulting from the present method is of effectively high strength and has other structural properties necessary to constitute a secure joint along the pipe wall, yielding a pipe product which is thus effectively completed by a single operation. In fact, the tests have shown that pipes so made will withstand extremely high pressures and thus may be put to practically any service required of pipe or tubular structures of this general character.

By way of illustration of the practice of the process, the annexed drawings show an example of apparatus which may be employed, and likewise show diagrammatic or simplified views of the pipe undergoing the operation and of the pipe seam and cleft at various stages of forming a joint, including comparative illustration of a certain operation in accordance with prior practice.

Referring to the drawings:

Fig. 1 is a longitudinal vertical section, taken centrally through a chuck device through which a pipe blank is advanced for operation of the present method;

Fig. 2 is an elevation taken from the left-hand end of Fig. 1, but showing certain portions of the apparatus in section on other vertical planes;

Fig. 3 is a schematic view taken in vertical section along the cleft line of the passing pipe blank, to illustrate the presently understood effect of the combined arc welding and forge welding operation;

Figs. 4, 5 and 6 are transverse, fragmentary sections of the pipe wall at the cleft region, respectively before, during and after certain stages of the process, e. g. as indicated by section lines 4—4, 5—5 and 6—6 in Fig. 3;

Fig. 7 is a view similar to Figs. 4 to 6, but showing the type of imperfection which may occur in an outside welded joint made without the present invention;

Fig. 8 is a fragmentary section like Fig. 6, showing the pipe of the latter after it has received a second, inside welding operation; and Fig. 9 is a diagrammatic view showing procedure of the present sort as applied to another welding operation, e. g. as between edgewise abutted plates.

While the present procedure can be practiced in other ways, as by holding the pipe blank or like work stationary and moving the arc welding instrumentalities along the cleft to be joined, a particularly effective mode of operation is to advance the blank endwise, i. e. in the direction of its axis through a welding chuck or fixture, so that the desired weld is effected as the cleft travels past the arc electrodes. One apparatus suitable for this purpose is shown in Figs. 1 and 2, being essentially as set forth in the above identified Darner and Caine application, Serial No. 99,101. This device is essentially a chuck to which the pipe blank 20 is advanced endwise, with its longitudinal cleft 22 uppermost, in the direction of the arrow, the means for receiving and advancing successive pipe blanks to and through the chuck, and for guiding the cleft into proper position being disposed to the right of the illustrated device, but omitted from the present drawings since it does not form a part of this invention.

Thus in the chuck device, generally designated 30, the pipe blank 20 and its cleft 22 travel longitudinally past the arc welding means which may comprise one or more electrodes and are here shown as constituted by the pair of electrodes 33, 34 arranged in a longitudinal array (and connected through suitable means, not shown) so that welding arcs are struck from the electrodes to the pipe at the vicinity of the cleft. It will be understood that the number of electrodes and the precise nature of the arc welding operation are not critical in relation to the present invention; any suitable arc welding arrangement may be employed, although it is preferred that the operation be controlled, as in a conventional manner, to maintain a more or less uniform penetration of the arc weld cavity and thus of the puddle of molten metal into the pipe wall at the cleft line, for example preferably at least halfway through the wall and more usually from five-eighths to three-fourths of the distance from the upper to the undersurface of such wall.

The chuck 30 comprises a frame structure 36 carrying heavy end plates 37, 38 which are essentially identical, so that description of one will suffice for both. Thus the end plate 37 (Fig. 2) has a central aperture 40 somewhat larger than the circumference of the pipe blanks and provided with circumferentially spaced slots or notches 42 which accommodate and support respective roller cages 45, each cage 45 carrying a multiplicity of rollers 46 arranged in a longitudinal array lengthwise of the pipe path so as to bear on the surface of the pipe blank. Seated in the bottom of each slot 42 is a supporting bar 49, which, like the roller cages 45, projects beyond the outer face of the plate 37, as shown in Fig. 1. Through the end of the bar 49 a bolt 50 is threaded, having a rounded head 52 which seats in a rounded depression 53 at the rear face of the adjacent roller cage 45. The bars 49 being mounted securely in the notches, as by means of brackets 54 carried by the end plate 37, it will now be seen that upon turning up the bolt 50 with its associated wrench 56, the roller cage 45 may be adjusted toward the center of the opening 40, the bar 49, the bolt 50 and head 52 serving to back-up the cage for pressure of the rollers against a pipe blank traversing the chuck. As will now be appreciated, exactly similar mounting and adjusting means, designated by identical reference numbers, are provided adjacent the other end of each roller cage, i. e. at the vicinity of the plate 38.

While various numbers of roller sets (and various numbers of rollers in each) may be employed around the periphery of the pipe path in the chuck, the illustrated apparatus includes seven such sets, each with five rollers 46. These sets are spaced, as shown, around the pipe path, except at the top (adjacent the cleft) where other roller cages 58, 59 are disposed. The roller cages 58, 59 respectively carry a multiplicity of smaller rollers 60, 61 likewise arrayed lengthwise of the pipe path and mounted at the inner, facing sides of the cages so as to be disposed close to the cleft line, the position of the latter being indicated at 22 in Fig. 2.

The roller cages 58, 59 are mounted for rocking adjustment, to move the respective sets of rollers 60, 61 toward and away from the pipe surface. For example, the cage 58 carries at each end a stub shaft 64 appropriately journaled in the corresponding plate, e. g. the plate 37. The projecting end of the shaft has keyed to it an arm 65, which has an end portion 66 disposed between the spaced ends of a pair of aligned screws or bolts 67, 68, that are threaded in the mounting lugs 69, 70 on the plate 37 and are thus capable of being adjusted and locked, so as to hold the arm 65 (and the roller cage 58) in any desired angular position about the axis of the shaft 64. Thus the rollers 60, which are offset from the axis of the shaft 64, can be adjusted in a direction essentially normal to the surface of the pipe blank. It will be understood that similar means (with identical reference numbers) are provided at the opposite end of the chuck, i. e. adjacent the plate 38, for the other end of the cage 58, and that the ends of the cage 59 also have the same adjusting means, not here shown.

The chuck may also include a so-called register roller 80 (Fig. 1) adapted to bear on the surface of the pipe blank in bridging relation to the cleft line, near the entering end of the chuck. The roller 80 is supported in a yoke device 81 which is pivotally mounted to the plate 38 at 82, off-center from the axis of the roller 80. The yoke 81 is adjustable about the axis 82 by a bolt 84 which is pivotally mounted to the yoke at 85 and traverses a vertical slot 86 in the end plate, wherein it may be secured in a desired position of adjustment by suitable lock nuts, as shown. The chuck device may include other means cooperating for efficient welding function on the pipe blank, for instance the flux shields 88 carried by the cages 58, 59 to prevent the loose granular flux, which is used along the weld, from escaping under the rollers 60, 61, these and other instrumentalities being more fully described in the aforesaid co-pending application Serial No. 99,101.

Thus the chuck comprises a multiplicity of peripherally distributed sets of longitudinally arrayed rollers, all adapted to bear compressively on the surface of the passing pipe blank, and each set being adjustable radially of the blank and adapted to be locked in adjusted position. Accordingly as the pipe blank 20 passes through the chuck, it is engaged in rolling contact by all of the described rollers which serve the primary purpose of guiding the blank and maintaining it in appropriate position for operation of the welding electrode means indicated at 33, 34. A heavy layer of granular flux is continuously deposited on the upper surface of the pipe blank, in bridging relation to the cleft 22, from a suitable flux delivery pipe 89, the electrodes 33, 34 being thus submerged in the flux while performing their arc welding function. The apparatus may also include an internal carriage 90, supported on a boom or the like (not shown) which has side guiding rollers 92, a bottom roller 94 and an upper roller 95 in opposed compressive relation to the register roller 80. The carriage 90 may also support a suitable chill 96, arranged to engage the underside of the pipe blank along the cleft region, for promoting solidification of the molten weld metal, the chill 96 comprising, for example, a water cooled block of copper or the like. Experience has demonstrated that the cooling effect of the chill is nevertheless insufficient to prevent the forge-welding operation herein described and understood to occur while the cleft is in the vicinity of or just beyond (i. e. to the left of) the electrodes 33, 34.

In carrying out the present method, all of the pipe-engaging means of the chuck, particularly the rollers 46, 60, 61 and 80 are preliminarily adjusted, as by the means described above, so as to exert large compressive force radially against the passing pipe blank. For example, in the case of pipe blanks having a diameter of 20 to 30 inches and a wall thickness of $\frac{1}{8}$ inch to $\frac{1}{2}$ inch, the pressure of the several rollers on the outside of the blank, particularly the rollers 46 which are distributed about most of the circumference, may be such that the pressure between the cleft edges, i. e. the pressure of one cleft edge against the other considered over the total radial extent of the unwelded cleft edge faces, is of the order of substantially more than a thousand pounds per square inch. In one instance where such a pipe blank, having a wall thickness of $\frac{5}{16}$ inch, was advanced at a welding speed of 50 inches per minute, and where at the locality of the arc welding puddle the pressure between the portions of the cleft edge faces not penetrated by the arc (i. e. fusion) weld cavity or its molten contents was approximately 13,000 pounds per square inch, a satisfactory forge weld was obtained between those portions of the cleft. In the case just mentioned, the fusion weld produced by the arcs penetrated through about 85% of the original wall thickness, so that the pressure at the completely unwelded locality of the cleft (i. e. prior to the arc region), as measured in force per unit area over the total cleft edge face, was proportionately less, e. g. about $\frac{15}{100}$ of the figure named.

However measured, the pressure established between the cleft edges by the radial compression of the many rollers on the pipe should have a relatively large value and may advantageously be maintained throughout the path of the pipe blank in the chuck 30, or in any case through a region in advance of, at and beyond the locality of the welding electrodes 33, 34, say for at least a few inches to the right of the electrodes and for 10 to 15 inches or so beyond them. It may be explained that the seam or cleft pressure necessary to provide an effective forge weld is not only substantially greater than that needed merely to keep the cleft closed, but also varies inversely with the percentage of penetration of the primary or fusion weld, and directly with the welding speed. Thus decreased penetration of the arc weld, or higher speed of travel of the pipe blank, or both, will result in a lower temperature in the portion of the cleft to be forge welded, so that a higher forging pressure is required. In consequence, adjustment of the chuck rollers to exert greater or less compression may be correspondingly necessary or permissible when one or more of these operating conditions is changed in one direction or the other.

The arc welding operation of the electrodes 33, 34 heats the cleft edges to a temperature sufficient to melt the desired weld cavity in the steel skelp and to provide a puddle of molten weld metal, i. e. steel in part deposited from the electrodes themselves (which are continuously fed by conventional instrumentalities, not shown). Heat from the molten region is promptly conducted into the metal of the skelp, at the faces of the cleft below the arc puddle. Under the described tremendous pressure exerted transversely of the cleft at this region, the cleft faces are promptly forge-welded together, indeed as soon as the metal there reaches the necessary temperature, which is from about 1500° F. to about 2200° F., in the case of ordinary types of steel suitable for pipe manufacture. As the pipe continues to progress, i. e. to the left as seen in Fig. 1, the forged weld thus formed becomes increasingly rigid (presumably by the cooling action of the chill 96), while the molten metal in the puddle produced by the arcs, may commence to solidify. At this stage, the cleft edges are now rigidly and positively held against any mutual motion, while the tremendous pressure is preferably maintained between them, i. e. at the region of the now essentially completed, forge weld. Accordingly the molten metal of the embedded bead solidifies in suitably perfect condition, appropriately and strongly bonded to the adjacent portions of the skelp and yielding a fully welded seam as the pipe blank merges from the left-hand end of the chuck 30.

Referring to Fig. 3, the operation just described is illustrated in diagrammatic fashion, it being understood that the dimensions and relations of various changes and steps are arbitrarily selected for clarity of illustration, rather than as necessarily representing the exact positions or relations which may occur in any given operation, except in that the sequence of effects is understood to be as here indicated, in preferred practice of the invention. As shown in Fig. 3, the cleft is indicated at 22 by the face of one of the abutting edges of the skelp. At the region of the electrodes 33, 34 (the pipe blank being advanced in the direction of the arrow) the arcs melt out a cavity 100 along the cleft, molten metal 102, as derived from the cavity and from the electrodes themselves, being continuously backed up beyond the cavity. Beyond the arc region, the cavity is filled with the molten metal 102 as shown, commencing to solidify (presumably from the bottom upwards) at a certain distance from the arc electrodes, as indicated at 103. Final solidification is completed at a still further point indicated by the solidified body of weld metal 104. By virtue of the heat from the arcs and the tremendous transverse pressure on the cleft, forge-welding is effected in the lower part 106 of the cleft, for example at the region 107. While in Fig. 3 the forge-welding locality 107 is shown as displaced somewhat beyond the arc region, it is likely that the forging action commences at or very close to the arcs and continues in a progressive or somewhat gradual fashion through a further space of pipe travel, perhaps to the region 107, or perhaps in fact not very far from the arcs. In any event, it appears that the forge weld is essentially completed well before the cleft zone reaches the point of full solidification of the upper weld metal indicated at 104, and apparently in most cases before much solidification of this metal has set in. Hence the lower part of the cleft is represented as forge-welded at the locality 108, in the vicinity of the region 103. Thus as the molten metal 102 cools to its final, solid state 104, the cleft edges are positively held by the forge-welded structure 108.

These operations are further illustrated by Figs. 4, 5, and 6, in which the first view shows the pipe blank 20 and its cleft 22 fully closed by the tremendous pressure described above. In Fig. 5 the molten puddle 102 of weld metal is shown, it being assumed that the lower part 106 of the cleft is not as yet fully forge-welded, although as explained above, it is difficult to determine at exactly what point the forge weld is completed beyond the convincing evidence that it is secured prior to the solidification of the puddle 102. Fig. 6 shows the finished seam, here comprising the solidified weld bead 104 and the lower, forge-welded region 108, the existence of the latter being evidenced by a ridge or projecting surface 110 along the inner face of the pipe at the cleft line. As explained above, this structure has been found to afford a simple, secure joint for the cleft, and thus to provide, in effect, a pipe of completed character, suitable for many uses.

While in the foregoing all the heat required for the forge weld has been described as furnished by the electric arc operation, and while such may often be the case in practice, it will be understood that heat may also be derived from other sources, especially such as have some function relative to the primary, fusion weld. For instance, where a gas flame (as mentioned above but not shown) is directed on the passing pipe cleft at a locality just prior to the welding zone, for better cleaning or other preparation of the cleft edges, such flame may have an appreciable pre-heating function and thus contribute to the ultimate elevation of the unfused part of the cleft to the temperature needed for a forged weld. While the proportion of heat supplied by such burner will often be small, pre-heating with larger burner devices may in some cases provide a larger amount of the heat required for the forge welding. Furthermore, although the invention is of peculiar advantage where the fusion weld is of the electric arc type, the described procedure of substantially simultaneous fusion and forge welding can be performed with other kinds of fusion welding, such as a gas fusion weld (e. g. with a high temperature gas flame), and in the latter case a rather considerable pre-heating may be economically used. In any event it will be appreciated that a special and preferred feature of the invention resides in utilizing, for the forge weld, heat which in at least major part is derived from heat supplied (usually in the main at the weld point but sometimes in part by pre-heating) for effectuation of the fusion weld. Indeed where in addition to the heat furnished at the weld point by arc, flame, or deposit of molten metal, the only other heat is that introduced by a small pre-heating burner such as mentioned above in connection with an arc weld, or by a relatively larger pre-heater as may be desired to raise the temperature of the work for the sake of another type of fusion weld, it may be said in effect that the heat employed in the forge welding is derived or conducted from that introduced to effectuate the fusion weld.

Fig. 7 shows, for illustration, effects which may occur in a welding operation of the sort shown in Figs. 1 and 2 but wherein no forging is performed in the lower region of the cleft. Thus the weld bead 104a is disposed in appropriate relation to the pipe 20, but because some relative motion of the cleft edges occurred during solidification of the bead, a crack 112 has been formed in the weld. As also illustrative of a defect which may occur in such operation, although not necessarily at the same time or place as the crack 112, the lower region 106a of the cleft is shown slightly parted, and a pin hole or cavity 114 appears above the cleft region 106a in the weld bead, such cavity being formed, for example by melted flux which was trapped at the region 106a and which traveled partly upward into the weld metal 104a as the latter was solidifying. It will now be seen that the present process, especially in preventing relative movement of the cleft edges during freezing of the puddle 102 to the solid condition shown at 104 in Fig. 6, greatly minimizes the occurrence of defects such as present at 112 or 114 in Fig. 7, i. e. defects which may in either case be open to the surface or completely concealed. Since experience has shown that flaws or imperfections of this character are increased as the rate of operation, i. e. the rate of pipe travel, is raised, it will now be appreciated that the present process permits higher speeds of pipe manufacture, without sacrifice of quality in the finished seam.

It has been explained that in some cases a supplemental weld may be provided on the inner surface of the pipe blank, for example in suitable apparatus (not shown) wherein the blank is advanced past internal welding means, with the cleft line at a bottom position. Fig. 8 shows the pipe of Fig. 6, as further processed by such inside weld, at 115, it being noted that the weld 115 conveniently penetrates into the previous weld 104. While in prior types of operation, the inside weld may serve to obviate some of the defects (Fig. 7) formed during the first or outside weld, it cannot affect those to which it does not reach; hence the defects, arising with undesirable frequency at high rates of production remain for manual repair or as undetected flaws in the finished pipe.

By way of further illustration, Fig. 9 shows a like procedure embodied in other welding operations, for instance where two plates 120, 121 are to be butt-welded. Here the welding electrode 122 is moved progressively along the cleft 124, through a suitable layer of flux 125 to produce an embedded weld bead 126, in essentially similar fashion to the operation on a pipe blank as described above. At the same time, heavy edgewise pressure is applied to the plates 120, 121, for example as indicated by the arrows 128, 129 (by hydraulic or other suitable means, not shown), of sufficient value to effect a forge-weld in the lowermost region 130 of the cleft. A complete and effective joint is consequently formed between the plates, by a single operation and without requiring or permitting the penetration of the fusion weld metal 126 more than partway through the wall at the cleft zone. It will be appreciated that similar operation can be obtained in other types of joint, involving abutting metal surfaces. Nevertheless, as explained above, the invention is of peculiar novelty and special advantage in pipe manufacture, in that the application of forge-welding pressure is conveniently effected by radial compression of the pipe blank, and in that the process provides the extremely valuable result of preventing cleft-edge displacement during solidification of the fusion weld, and thus of minimizing flaws or imperfections in that weld itself.

It is to be understood that the invention is not limited to the specific procedures herein described but may be carried out in other ways without departure from its spirit.

I claim:

1. A method of welding a seam along the cleft formed by the edge of a metal member abutting another metal surface over an area extending along said cleft and having a predetermined depth across the edge of the metal member, comprising arc-welding the seam along one side of said cleft while controlling said arc-welding to inhibit penetration of molten metal beyond a part of the said depth, and pressing the said metal edge against the other metal surface with sufficient force to forge weld a remaining part of the said depth of said abutting area, while maintaining heat in said remaining part to effectuate said forge weld, said heat being at least in major part conducted from the arc-welding operation.

2. A method of welding a seam along the abutting edges of a longitudinal cleft in a pipe blank, comprising arc-welding along one side of said cleft to effect arc weld penetration through a part of said cleft, while compressing the pipe blank radially to force said edges together sufficiently to forge weld said edges along another part of said cleft by heat at least in major part conducted from said arc-welding operation.

3. A method of welding a seam along a longitudinal cleft in a pipe blank, comprising forcing the edges of the cleft together while arc-welding along one side of the cleft to effect weld penetration through a part of said cleft, and maintaining said edges under closing force after the arc-welding, the closing force exerted on the edges during and after said arc-welding being sufficient to forge weld another part of said cleft by heat at least nearly all transmitted from the arc-welding operation.

4. A method of welding a seam along a longitudinal cleft in a pipe blank, comprising arc-welding the seam on one face of the blank progressively along the cleft while controlling said arc-welding to prevent melting the wall of the blank beyond a part of the way through the cleft and radially compressing the pipe to force the edges of the cleft together throughout a region in advance of, at and beyond the locality of arc-welding operation, and said compression being sufficient to forge weld the cleft progressively along it in accompaniment with the arc-welding operation, in the region of said cleft deeper than the region of melting by the arc-welding operation, the said region of melting being filled with molten metal by said arc-welding progressively along the cleft and said forge weld being completed sufficiently in advance of solidification of said molten metal so as to hold the cleft edges against mutual displacement during said solidification.

5. A method of welding a seam along a longitudinal cleft in a pipe blank, comprising forcing the edges of the cleft together while arc-welding along one side of the cleft to effect penetration of molten weld metal at least about half way through the cleft, said arc-welding being controlled to inhibit such penetration to the other side of the cleft, so that a part of the cleft adjacent said other side remains unmelted, and continuing to force the edges of the cleft together after said arc-welding operation, and during a period while said weld metal remains molten, said edges being forced together as aforesaid both during and after the welding operation by radially compressing the pipe blank, and said radial compression being sufficient to forge weld the aforesaid last-mentioned part of the cleft by heat at least nearly all transmitted from the arc-welding operation, and said forge weld being completed before said molten weld metal has fully solidified.

6. The method described in claim 5 which includes preliminarily supplying heat to the pipe blank by pre-heating the latter progressively along the cleft region in advance of the arc-welding locality, said preliminarily supplied heat contributing to the effectuation of the forge weld.

7. A method of welding a seam along a longitudinal cleft in a pipe blank, comprising arc-welding the seam on one face of the blank progressively along the cleft while controlling said arc-welding so that molten metal penetrates substantially less than through the wall of the blank at the cleft, and holding the pipe under radial compression to force the edges of the cleft together, said compression being exerted to effect said edge engagement throughout a region in advance of, at and beyond the locality of arc-welding operation, and said compression being sufficient, by heat introduced in the pipe wall and at least in major part transmitted through the pipe wall from said arc-welding operation, to forge weld the cleft progressively along it in the region of the wall not penetrated by the aforesaid molten weld metal, the molten weld metal solidifying progressively along the cleft through a region beyond the arc operation and said forge weld being completed sufficiently in advance of solidification of said molten metal so as to hold the cleft edges against mutual displacement during said solidification.

8. A method of welding a seam along a longitudinal cleft in a pipe blank, comprising forcing the edges of the cleft together while arc-welding along the cleft at the outside surface of the pipe blank to effect penetration of molten weld metal at least about half way through the cleft, said arc-welding being controlled to inhibit such penetration to the inside surface of the blank, so that a part of the cleft adjacent said inside surface remains unmelted, and continuing to force the edges of the cleft together after said arc-welding operation and during a period while said weld metal remains molten, said edges being forced together as aforesaid both during and after the welding operation by radially compressing the pipe blank, and said radial compression being sufficient to forge weld the aforesaid last-mentioned part of the cleft by heat introduced in said part and at least nearly all transmitted from the arc-welding operation, said forged weld being completed before said molten weld metal has fully solidified.

9. A method of welding a seam along a longitudinal cleft in a pipe blank, comprising fusion welding the seam on the outside of the blank progressively along the cleft while controlling said fusion welding to prevent melting of the wall of the blank beyond a part of the way through the cleft, the edges of the cleft being plane surfaces shaped to lie in a radius of the pipe and thereby to fit in substantially exact conformity when said edges are closed together, and the fusion welding operation embracing the introduction of heat to effectuate the same; and radially compressing the pipe to force the edges of the cleft together through a region in advance of, at and beyond the locality of fusion welding, said compression being sufficient to forge weld the cleft, by heat derived from that introduced to effectuate the fusion welding operation, in the region of said cleft deeper than the region of melting by the fusion welding, the said region of melting being filled with molten metal by said fusion welding progressively along the cleft and said forge weld being completed sufficiently in advance of solidification of said molten metal so as to hold the cleft edges against mutual displacement during said solidification.

10. The method described in claim 9 in which a minor part of the introduced heat is supplied by preheating the pipe blank progressively along the cleft region in advance of the locality of fusion welding.

WALTER S. SCHAEFER.

REFERENCES CITED

The following references are of record in the file of this patent:

UNITED STATES PATENTS

| Number | Name | Date |
| --- | --- | --- |
| 537,276 | Coffin | Apr. 9, 1895 |
| 989,497 | Frick | Apr. 11, 1911 |
| 1,298,590 | Smith | Mar. 25, 1919 |
| 1,948,801 | Riemenschneider | Feb. 27, 1934 |
| 2,061,671 | Riemenschneider | Nov. 24, 1936 |
| 2,139,771 | Riemenschneider | Dec. 13, 1938 |
| 2,422,305 | Kopec | June 17, 1947 |
| 2,444,778 | Kopec | July 6, 1948 |
| 2,510,180 | Jones | June 6, 1950 |
| 2,567,012 | Donelan | Sept. 7, 1951 |